May 3, 1955
O. C. HARRIS
2,707,580
CANNED LIQUID DISPENSER HAVING A HINGED
LID CARRYING HOLLOW PIERCING POINTS
Filed July 16, 1954
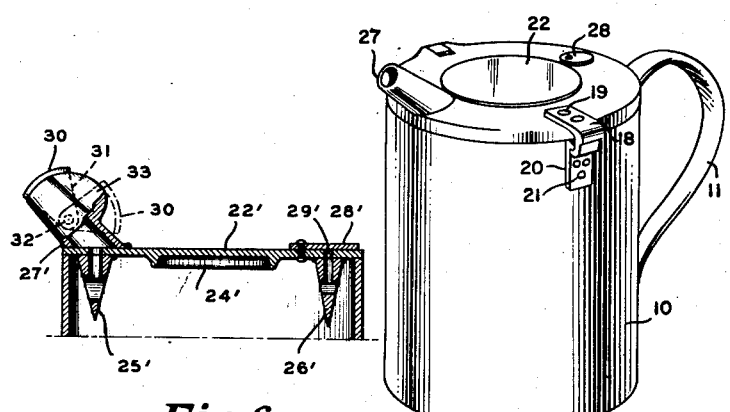
Fig. 6.
Fig. 1
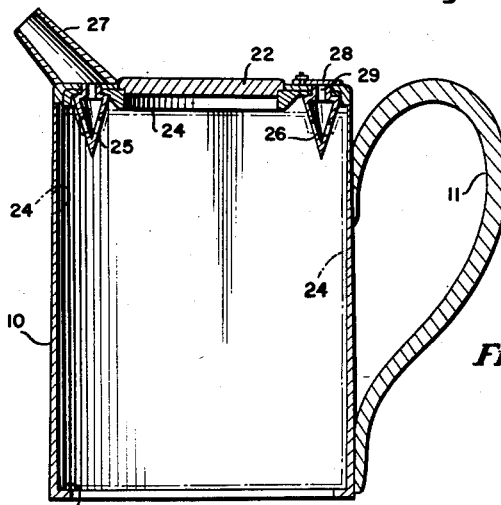
Fig. 2
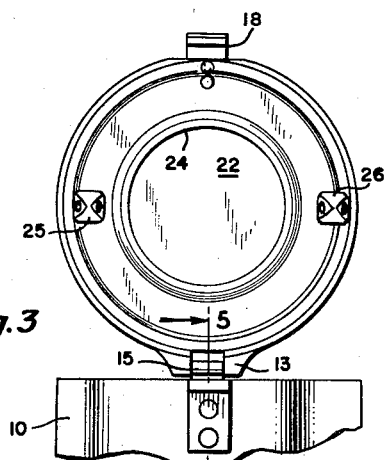
Fig. 3
Fig. 5
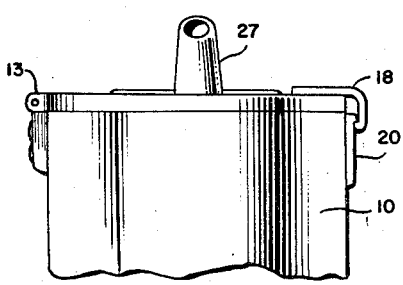
Fig. 4
INVENTOR
Otto C. Harris
BY
ATTORNEY

2,707,580

CANNED LIQUID DISPENSER HAVING A HINGED LID CARRYING HOLLOW PIERCING POINTS

Otto C. Harris, Washington, D. C.

Application July 16, 1954, Serial No. 443,846

3 Claims. (Cl. 222—83.5)

This invention relates to the handling of foods including those in liquid form and contained in hermetically sealed cans such as for example milk, evaporated or otherwise. The invention particularly relates to a dispenser by means of which liquid may be dispensed from hermetically sealed cans or other containers.

It has been customary to punch a hole in a can containing evaported milk or other liquid and to pour the milk or other substance from the can as needed. This resulted in the spilling of the milk, leaving some of the milk on the exterior of the can around the pouring opening, exposing the contents of the can to contamination as well as presenting an unsightly appearance.

Efforts have been made to provide containers or holders for sealed cans of milk or other liquid and by means of which the contents could be dispensed. These have not been satisfactory because they were clumsy, expensive, they increased the possibilities of contamination and they were otherwise unsatisfactory.

It is an object of the invention to overcome the problems above enumerated by providing a simple, inexpensive holder for a sealed can of milk or other liquid and by means of which the contents can be readily dispensed as desired.

Another object of the invention is to provide a canned liquid dispenser of attractive appearance, in which a sealed liquid container can be easily placed and the contents dispensed, as well as a dispenser of this character having a removable pivoted lid or top with spaced hardened hollow tapered piercing points through one of which is associated an annular pouring spout through which the liquid can be poured while air is admitted through the other piercing point to replace the liquid discharged.

A further object of the invention is to provide a canned liquid dispenser in which a can containing liquid may be placed and such liquid dispensed therefrom immediately upon the closing of the lid or cover, such lid carrying piercing points which are forced through the end wall of the can by the closing action of the lid, and providing a tight joint therewith, as well as a dispenser in which the can is held solidly in fixed position.

Other objects and advantages will become apparent from the following description taken in conjunction with the accompanying drawings wherein:

Fig. 1 is a perspective illustrating one application of the invention;

Fig. 2, a vertical section;

Fig. 3, a fragmentary side elevation of the container with the lid slightly raised ready to be closed and illustrating the lid fastening mechanism;

Fig. 4, a bottom plan view of the lid;

Fig. 5, a detailed section through the separable parts of the hinge; and

Fig. 6 is a section through a slightly different embodiment.

Briefly stated, the canned liquid dispenser of the present invention comprises a cylindrical container having a handle and with its top and bottom ends open but with an inwardly extending supporting flange on its lower end. The container is provided with a latching member and a hinge member disposed in opposed relation at right angles to the handle. A lid is provided for the top of the container having hinge and latching portions cooperating with those on the container, so that the lid may be attached to the container readily separated therefrom. In opposed relation on the lid, in line with the handle, are provided a couple of hardened hollow piercing points, and over the one remote from the handle is mounted a pouring spout and over the one nearer the handle is pivoted a cover. A can of milk or other liquid is placed within the container and the lid closed causing the piercing points to rupture the can and the latch to firmly secure the lid in position. The inner surface of the lid is provided with a concentric ridge in order to hold the can solidly. The lid may be raised by the use of a conventional can opener and thereafter the hinge mounting the lid may be separated so that the lid may be removed for sterilization.

With continued reference to the drawings the canned liquid dispenser of the present invention comprises a cylindrical container 10 having a handle 11. The container has an open upper end, but its bottom end is provided with an annular inwardly extending supporting flange or projection 12.

The container is provided at one edge with a hinge member 14 having spaced hinge portions 13 in which a pintle 14 is mounted. This pintle may be received in a second hinge member 15, a slot 16 being provided through which the pintle may be inserted and removed. The hinge member 15 may be secured by rivets 17 or fastened in any other desired manner. At its edge opposite the hinge member 13 the lid is provided with a latch member 18 secured by rivets 19 or other fastening means to the lid, such latch being adapted to spring over and engage a cooperating latch member 20 secured by rivets 21 on the wall of the cylindrical container 10.

Deformation of the container permits the latch member on the lid to become disengaged from the latch member on the container so that the lid may be raised for opening or lowered for closing. Disengagement may be effected by the use of a conventional bottle opener or by applying pressure on the side of the container. The lid therefore may be fastened in place or unfastened and completely removed from the container for easy sterilization.

The lid is provided with an annular sleeve portion 22 extending slightly into the upper end of the container, thereby reinforcing the structure. The lid also is provided with an annular concentric ridge 23, the diameter of which is approximately one half the diameter of the lid, in order that such ridge may engage and exert pressure upon the top 24 of a hermetically sealed milk or other liquid-containing can placed within the container for holding the can solidly against movement within the container.

In order to provide a discharge opening and an opening for the inlet of air through the lid into the can, hollow, tapered piercing points 25 and 26 are mounted in the lid adjacent each edge in alignment with the handle. The interior of these piercing points is open to the atmosphere at the top of the lid, a spout 27 being in communication with the piercing point 25 located the greater distance from the handle, while the opening 28 in communication with the other piercing point is provided with a closure 29 mounted on a pivot 30 which may be slipped over or away from the opening in the lid. The piercing points, due to their hardness, readily pierce the soft metal at the end of the can, but due to the fact that they are tapered they provide closures for the openings which they produce since the can is held solidly within the container.

In the use of the device a can, of milk or other liquid, of an external diameter and height slightly less than the internal diameter and height of the dispenser is placed within the container and the lid is snapped closed. The container is picked up by the handle and at the same time the small cover for the vent opening is moved to allow air to enter the vent, whereupon liquid from the can can be poured from the spout of the dispenser.

After the contents of the can have been used, or before that time if desired, the lid may be unlatched by means of a conventional bottle opener or by applying pressure to the lower of the latch members, whereupon the lid may be raised and then forced downwardly to cause the pintle to pass through the slot leading to the transverse opening in the hinge member on the can, whereupon the lid with its piercing points can be sterilized with or without the remaining portion of the container.

After the contents have been removed the can may be easily removed from the container by extending the fingers upwardly against the bottom of the same through the lower end of the container.

It will be apparent that the present invention is an attractive, practical, useful dispenser which can be kept sanitary and which will last indefinitely.

In Fig. 6 is disclosed a slightly different embodiment, including a lid 22' of pressed metal, such lid having hollow piercing points 25' and 26', the interior of the piercing point 25' being somewhat larger than that of the piercing point 26' to permit greater flow from the container through the spout 27'. The piercing points may be spot-welded to the lid, and the pouring spout may be affixed in a similar manner.

The lid has an internal concentric rib 24' intended for engagement with the upper end of the container to engage and solidly hold a can of liquid to be dispensed. The lid likewise has a pivotal closure 28' for covering the air opening 29', which is adapted to communicate with the interior of the can through the piercing point 26'.

A pivotal cover or cap for the discharge end of the spout may be provided, such cover or cap having a curved spout covering portion 30, with its internal curvature corresponding to that of the cap, and with a side portion 31 through which a pivot pin 32 is disposed to permit the cap to be moved into and from closing position. The cap has its upper surface knurled or provided with ridges for facilitating manipulation by the thumb when the device is held in the hand. The spout is provided with a curved thickened portion 33 providing a bearing surface for the covering portion. Thus the discharge and air inlet openings can be kept closed at all times except when it is desired to dispense liquid.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A container for holding a can of liquid for dispensing the contents thereof, a closure for one end of said container, said closure being pivoted on a hinge attached between said container and said closure, spaced hollow piercing points on the underside of said closure for creating openings in the end of the can for the dispensing of liquid and the admission of air respectively, said spaced hollow piercing points being located diametrically opposite each other and substantially equidistantly from the hinge in order that they will move in a path substantially perpendicular to the top of the can of liquid during the piercing operation thereby preventing the formation of leakage paths between said piercing points and the top of the can.

2. The structure of claim 1 with the addition of a resilient latch member attached to said closure opposite said hinge, and cooperating with a lip element attached to said container, said latch being adapted to be engaged by a conventional bottle cap opener for springing said latch member away from said lip element to open said closure.

3. A container for holding a can of liquid for dispensing the contents thereof, a closure pivoted on one end of said container, spaced hollow tapered piercing points on the underside of said closure for creating openings in the end of the can for the dispensing of liquid and the admission of air respectively, said spaced piercing points being located diametrically opposite each other and substantially equidistantly from the hinge in order that they will move in a path substantially perpendicular to the top of the can of liquid during the piercing operation thereby preventing the formation of leakage paths between said piercing points and the top of the can, said closure having a concentric ridge on its under side substantially smaller than said closure for engagement with the top of the can from which liquid is to be dispensed to maintain rigid contacting relation between said piercing points and the can whereby subsequent leakage paths between said piercing points and the top of the can will be prevented.

References Cited in the file of this patent

UNITED STATES PATENTS

| 979,072 | Javins | Dec. 20, 1910 |
| 1,113,270 | Werner | Oct. 13, 1914 |
| 1,741,339 | Sager | Dec. 31, 1929 |
| 2,112,470 | Sevelle | Mar. 29, 1938 |
| 2,170,282 | Van der Spek | Aug. 22, 1939 |